(12) United States Patent
Franzius et al.

(10) Patent No.: US 12,243,181 B2
(45) Date of Patent: Mar. 4, 2025

(54) METHOD AND SYSTEM FOR CREATING AN ANNOTATED OBJECT MODEL FOR A NEW REAL-WORLD OBJECT

(71) Applicant: Honda Research Institute Europe GmbH, Offenbach/Main (DE)

(72) Inventors: Mathias Franzius, Offenbach (DE); Chao Wang, Offenbach (DE); Yufeng Jin, Offenbach (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 0 days.

(21) Appl. No.: 18/129,085

(22) Filed: Mar. 31, 2023

(65) Prior Publication Data

US 2024/0331321 A1   Oct. 3, 2024

(51) Int. Cl.
*G06T 7/11*   (2017.01)
*G06F 3/01*   (2006.01)
(Continued)

(52) U.S. Cl.
CPC .............. *G06T 19/20* (2013.01); *G06F 3/013* (2013.01); *G06F 3/016* (2013.01); *G06T 7/11* (2017.01);
(Continued)

(58) Field of Classification Search
CPC ......... G06T 19/20; G06T 7/11; G06T 19/006; G06T 2210/21; G06T 2219/004;
(Continued)

(56) References Cited

U.S. PATENT DOCUMENTS 10,353,532 B1   7/2019   Holz et al.
10,769,438 B2   9/2020   Bendale et al.
(Continued)

FOREIGN PATENT DOCUMENTS

CN   103793060   5/2014
CN   107463261   1/2021

OTHER PUBLICATIONS

Li Yi et al., "A Scalable Active Framework for Region Annotation in 3D Shape Collections", ACM Transactions on Graphics (ToG), Nov. 2016, pp. 1-12, vol. 35, No. 6.
(Continued)

*Primary Examiner* — Temesghen Ghebretinsae
*Assistant Examiner* — K. Kiyabu
(74) *Attorney, Agent, or Firm* — JCIPRNET

(57) ABSTRACT

A method and corresponding system for creating an annotated object model of a real world object. The method comprises providing an initial object model for an object for which an annotated object model shall be created, predicting properties of the object, visualizing a representation of the object based on the initial object model wherein the predicted object properties are displayed associated with the representation, and obtaining selection information based on at least one of a user gesture, user pointing operation, user speech input, and user gaze perceived by a user perception device. The method determines a portion of the object corresponding to the selection information, receives property information from a user input and associates the input property information with the corresponding portion of the object.

17 Claims, 6 Drawing Sheets

(51) Int. Cl.
*G06T 19/00* (2011.01)
*G06T 19/20* (2011.01)
*G10L 15/22* (2006.01)

(52) U.S. Cl.
CPC ............ *G06T 19/006* (2013.01); *G10L 15/22* (2013.01); *G06T 2210/21* (2013.01); *G06T 2219/004* (2013.01); *G06T 2219/2021* (2013.01); *G10L 2015/223* (2013.01)

(58) Field of Classification Search
CPC ............ G06T 2219/2021; G06F 3/013; G06F 3/016; G06F 3/011; G06F 3/017; G10L 15/22; G10L 2015/223; G10L 15/00; G06V 20/20
See application file for complete search history.

(56) References Cited

U.S. PATENT DOCUMENTS

| | | | | |
|---|---|---|---|---|
| 11,514,648 | B2* | 11/2022 | Sawhney | .................. G06T 7/70 |
| 11,657,419 | B2* | 5/2023 | Eder | .......................... G06T 7/80 |
| | | | | 345/418 |
| 2013/0201187 | A1* | 8/2013 | Tong | .................... G06V 40/172 |
| | | | | 345/420 |
| 2019/0180506 | A1* | 6/2019 | Gebbie | .................. G06T 19/00 |
| 2020/0233413 | A1* | 7/2020 | Einecke | ................. G06V 10/26 |
| 2023/0068798 | A1* | 3/2023 | Etchart | ..................... G06T 7/74 |

OTHER PUBLICATIONS

Xiaobai Chen et al., "A Benchmark for 3D Mesh Segmentation", ACM Transactions on Graphics (ToG), Jul. 2009, pp. 1-12, vol. 28, No. 3.

Yunhai Wang et al., "Active Co-Analysis of a Set of Shapes", ACM Transactions on Graphics (TOG), Nov. 2012, pp. 1-10, vol. 31, No. 6.

Qixing Huang et al., "Functional Map Networks for Analyzing and Exploring Large Shape Collections", ACM Transactions on Graphics (ToG), Jul. 2014, pp. 1-11, vol. 33, No. 4.

Oliver Van Kaick et al., "Co-Hierarchical Analysis of Shape Structures", ACM Transactions on Graphics (TOG), Jul. 2013, pp. 1-10, vol. 32, No. 4.

Youyi Zheng et al., "Recurring Part Arrangements in Shape Collections", Computer Graphics Forum, May 2014, pp. 1-10, vol. 33, No. 2.

Noa Fish et al., "Meta-representation of Shape Families", ACM Transactions on Graphics (TOG), Jul. 2014, pp. 1-11, vol. 33, No. 4.

* cited by examiner

METHOD AND SYSTEM FOR CREATING AN ANNOTATED OBJECT MODEL FOR A NEW REAL-WORLD OBJECT

TECHNICAL FIELD

The invention relates to the field of providing knowledge on real-world objects for robotic systems and specifically to create an annotated object model, which can be used for action planning for autonomous robots such as household assistance robots or the like.

BACKGROUND

In recent years, assistance systems including autonomous devices such as household robots became more and more popular. Such systems require a reasonable understanding of the environment in which they are intended to work in order to facilitate action planning which is necessary to fulfil a desired task. Unfortunately, this requires providing definitions of objects that might potentially exist in the environment of a robot, because the robot itself is not yet capable of automatically learning every detail, which might be important in the environment of the robot when executing a certain task. A profound "understanding" of the environment is essential for the robot and must be established before arbitrary tasks can be achieved by the robot without teaching each and every step necessary. Thus, it needs great effort to define for all potential objects in the environment of a robot the properties needed for planning actions in order to desired task of the robot. Currently, this information is input to a large extent by an operator of the system who recognizes the need of adding a new object to the knowledge base of the robot so that the robot thereafter can autonomously operate in the environment including this newly added object. While the addition of an object per se might be done easily, it is more difficult and time-consuming to add all the properties that the respective object has, even including the relation or possible relation to other objects, if this needs to be started from scratch. However, these properties are necessary in order to improve the robot's understanding of its environment so that a planning module of the robot (or rubber system) is able to act on or use such an object.

It would therefore be desirable if the system, which is used for inputting properties for objects or parts of objects, would be able to generate automatically at least some of the information that is needed to be input in order to annotate an object model for a new object. Such annotations (properties associated with an object or certain parts thereof) that are generated by the system should then preferably be revised and adjusted by an operator of the system. Such revision and adjustment of annotations is much faster than inputting all details on properties that an object can have directly by the operator.

SUMMARY

The method and system according to the present invention are suitable for assisting the process of creating an annotated object model of a real world object in an interactive manner. The system predicts for a not annotated object model of a new object properties that can be corrected, confirmed or dismissed by an operator. Further, the operator can also add additional properties. At all first, an initial object model is provided, which is the basis for creating the annotated object model of the new, yet unknown real world object. Thus, properties of the new object must be added to the initial object model defining the geometry of the new object. Based on this initial object model, a prediction of object properties is provided by the system. This prediction of object properties is then visualized in a representation of the object that is based on the initial object model.

The object properties are visualized together with the representation of the object such that the association between the properties and the object or a certain part thereof becomes clear to an operator. In order to add, delete or adjust predicted (proposed) properties of the object, the operator may then input selection information, which is obtained by the system using a perception device receiving gestures made by a user, user pointing operation, user speech input, or user gaze. "Gesture" is to be understood as any movement of part of the operator's body including specifically pointing at something using an index finger, for example. Such gestures can be observed by a camera used as perception device. Alternatively, or as a supplementary input, the user's gaze can be identified and analyzed. Further, a pointing operation can be obtained from a computer mouse as perception device. For a speech input a microphone can be the perception device. Based on this input selection information, a portion of the object that corresponds to the selection information is determined. It is to be noted that the different ways of inputting the selection information may also be combined.

The system then receives property information concerning the identified area of the object. The property information received by the system may be provided by the operator, for example, using speech input, and can include a category or any kind of characteristic of the object or part thereof. The speech input may not only include additional information, which is to be added as an annotation to the identified area of the object but also deletion of an initially predicted property. After the properties of the object has been corrected, deleted or added, the resulting annotated object model is stored, for example in a database including the world knowledge for a robot system.

DETAILED DESCRIPTION

Figure 1:
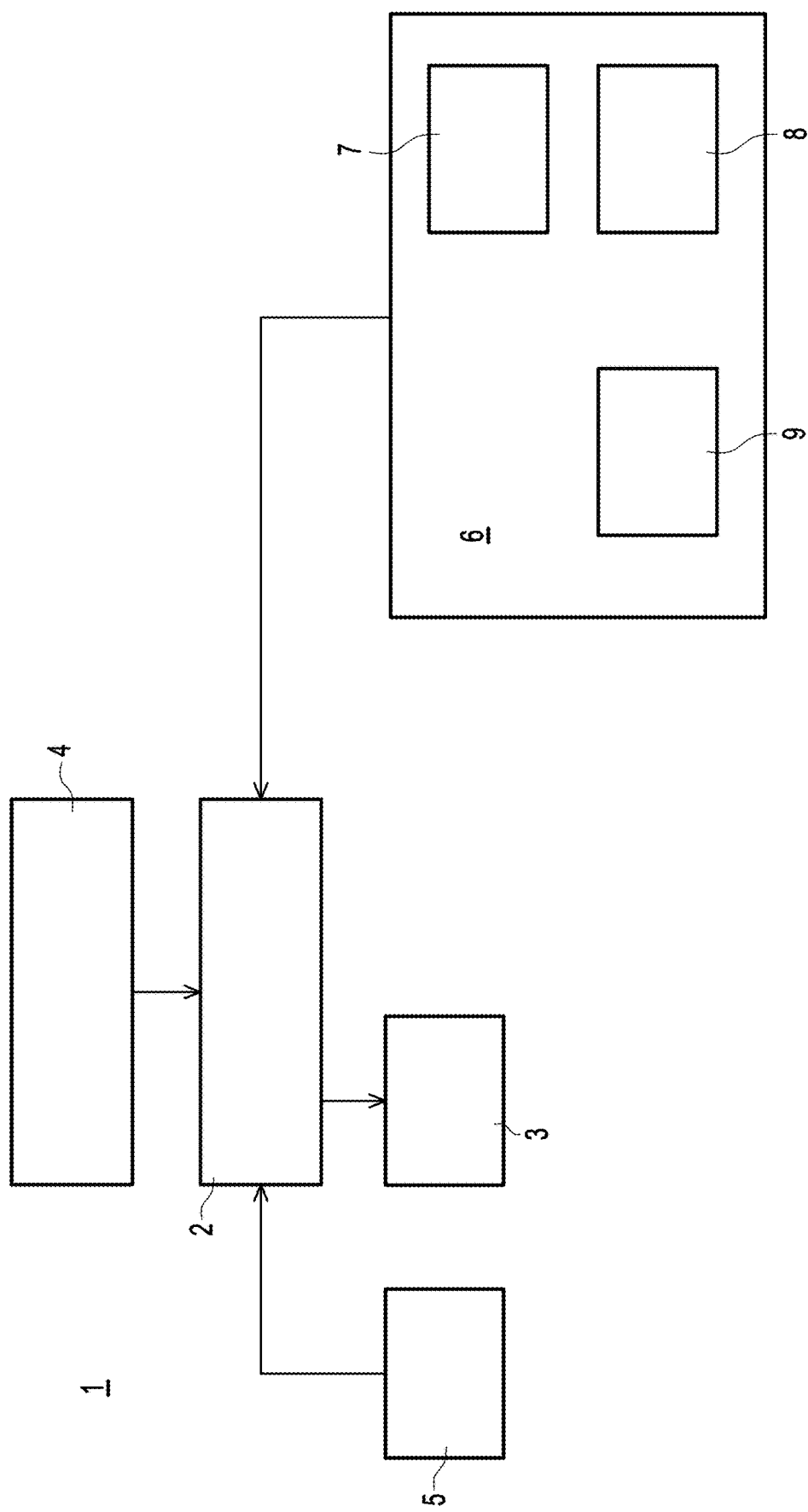
FIG. 1 shows a system overview including components according to a preferred embodiment of the present invention.

An embodiment of the present invention will be described in greater detail below with reference to the attached drawings. However, prior to going into the details and the structural elements for realizing the present invention, the general understanding of the present invention shall be improved by summarizing the method and system and explaining the respective advantages the invention has when new object models need to be annotated.

The main advantage is that the invention provides an interactive way of annotating an object model so that the effort and workload that is needed is reduced compared to commonly known procedures. According to the invention, the system predicts properties that are presented to the operator. Thus, the operator is provided with a "provisionally" annotated object model enabling the operator to quickly adapt the properties only as far as necessary. The interactive annotation allows intuitively selecting parts or areas of object for which an annotation to the object model shall be generated, deleted or adapted. This intuitive selection of the relevant parts or portions of the object significantly reduce the subjective effort for the annotation process that is needed. In particular, in case that the intuitive selection of a part or portion of an object is determined from gestures or generally motions and movements of the operator, for example, the operator's hand or gaze, and the adaptation of an annotation (property) associated with this part or portion of the object is executed using speech input from the operator, annotations for a new object may be created rather quick and with a reduced probability for making mistakes.

The procedure and system for annotating a new object as described herein may be combined with commonly known systems, which use for example input of information via a keyboard or mouse. Such a supplementary way of inputting information into the system is specifically advantageous in case that the speech recognition, which is the preferred way of inputting information to adjust the annotation for an object, causes errors because of misinterpretations of the speech input by an operator.

It is preferred that the representation of the object which is based on the initial object model and displayed together with the predicted object properties, uses an augmented reality display device or a virtual reality display device. Although other types of display may also be used in order to present the representation to an operator so that the operator may input selection information and execute adjustments on the annotations, it is preferred to use an augmented reality device (AR) or a virtual reality device (VR). Using such an AR or VR device allows the operator to easily recognize the association between parts or portions of the entire object which is represented on the AR or VR display device and the respective predicted properties. For example, the representation may be visualized together with the properties, wherein the properties are displayed in close spatial relation to the part to which they belong. The relation could even be indicated by using arrows or connection lines. Properties that directly concern the appearance of the object could be displayed directly in the representation of the object itself. For example, colors that reflect the property "color" can be used to render the representation of the object. Again, this allows an easy and intuitive way for the operator to adapt the associated property. Specifically, a correction of such a property can be displayed in real-time, because in case that the operator selects a surface of the representation of the new objects and inputs a new color information, and the representation using the predicted color may be replaced by a representation using the newly input color information. So a change of the color as one property of a certain area or even the entire object becomes immediately visualized and, thus, the operator can directly recognize that the correct property is now associated with the object or part thereof. It is evident, that the color is only one example and same is valid for any amendment of a property that can be visualized in the representation.

In case that the new object for which an annotated object model shall be created is present in the environment of the system, a camera might be used to capture an image of the new object or make a 3D scan of the object so that an overlay of object properties can be displayed using augmented reality. The captured image for the 3D scan can also be used in order to generate automatically the initial object model. However, it is not absolutely necessary that the new object is actually present or taking an image or make the scan of the object or that an image of the new object may be taken by the camera. Rather, it is also possible that only the (not yet annotated) object model of the new object is known and the representation is provided using virtual reality based on the object model.

As mentioned above, the selection of a part, portion, or area of the new object is determined from perception of an operator, specifically of gestures, which the operator makes with his hands. However, the perception may also include tracking eye movements of the operator so that a location on the surface of the object focused by the operator can be determined. Thus, in addition to analyzing the gestures in order to acquire the selection information, it is also possible to supplement the information, which can be analyzed, by information received from an eye tracker.

According to one alternative embodiment, the information received from the eye tracker may even substitute the perception of gestures made by the operator's hands at least for determining a portion of the object selected by the operator. In any case, it is possible that the perceived information is supplemented by a command, which is input by the operator. For example, based on a operate perception, selection information is required that, in first instance, defines a location on the surface of an object. In case that the operator, for example, touches with the fingertip certain point of the object (virtual object or real world object), the touch location is interpreted as selection information. It is to be noted that in case of augmented reality such a contact might be a contact of fingertip of the operator with the real world object, but in case that virtual reality displays are used, it is also possible that the contact point between the fingertip and the representation of the object is determined by calculating a collision between the operator's hand and the virtual object. Once the position of the contact is determined, a portion for which the following input or correction of an annotation shall be effective, must be defined. Without any further indication made by the operator, it could be thought of a portion around the identified location having a predefined size. The predefined size can be used to define a default area that is determined around the location of the contact. However, an additional input command can be used in order to enhance the selection information, for example by adjusting the size of the area or portion.

Further, depending on the determined location of the contact, the default for the identification of a certain portion of the object based on the selection information might differ: for example, in case that, as a predicted property, segmentation of the object is overlaid the representation of the new object, contacting a frame indicating the outer boundary of an identified segment, which is used for visualizing a segment of the object can be interpreted as selecting the entire segment of the object and, thus, a part of an object. This will become more clear when examples of an adaptation of annotations will be explained with reference to the drawings. However, as a general information, the specific location that is specified by the operator independent of the way how this location is specified (hand gesture, eyes movement, . . . ) may serve as a trigger for using one of a plurality of default settings used for identification of an area corresponding to the selection information.

The selection information input by an operator may even include a plurality of different parts of information: for example, the property of a part of an object may define its possible interaction with another part of the object. For example, a cap of the bottle might be put on an open end of the bottle. Contrary, a cork may be inserted into the open end of the bottle. Such properties that define a potential relation of one part to another part can also be defined using the present invention. In such a case, the selection information may comprise at least first information and second information. The first information defines a first part and the second information a second part so that the relation between these two parts can then be defined as a property associated with, for example, the first part identified based on the first selection information. Such an input of selection information may even be split. For example, the first selection information might be input into the system followed by the property which shall be associated ("can be put onto") before the second selection information is added to complete the annotated relation between these two parts. Obviously, the selection information may even include more than two parts.

In order to assist the operator when inputting selection information, it is advantageous if the system provides feedback on a contact or collision between the operator's hand and the representation of the object in case that virtual reality is used in order to provide the representation of the object. This could be achieved for example using a wristband or a glove with actuators that provide a stimulus indicating that the operator "contacted" the representation of the object. Such a feedback would even more improve the intuitive character of inputting selection information using natural gestures by the operator. The contact may be determined from a computed collision between the object and the hand of the operator. Such computation of the collision using for example point clouds to describe the object model and the operator's hand, are known in the art.

As mentioned above, perception of motions and movements of the operator is used in order to determine location of the objects indicated by the operator in order to annotate the respective part or area (portion) of the new object. However, the perception of gestures of an operator may even be used in order to improve the starting point of the annotation procedure, namely the initial object model. For example, the initial object model, which is used to represent the object for which the annotation shall be adapted, can be refined using gestures. The meshes (triangle meshes, polygonal meshes), point clouds, . . . that form the object model and that are used in order to create the representation can be corrected using the perceived gestures from the operator. Thus, the initial object model can be tailored and refined to be more close to the desired new object. In case that the camera is used in order to capture an image of the new object, an overlay of the representation of the object using the mesh, point cloud . . . can be presented to the operator who is then able to directly identify certain parts of the mesh (point of the points cloud, . . . ) to extend certain areas or delete areas in order to more closely reflect the true shape of the object. Such an adaptation of the initial object model can be immediately visualized so that the process of adding, correcting or deleting annotations is then started by the user after he is satisfied with the similarity between the initial object model and the real world model.

In principle, the prediction of object properties may be performed in a plurality of different ways. One possibility is to start from the initial object model, which might have been refined in order to more closely correspond to the new object and apply an algorithm on the model which analyses the object modelling data to determine properties for the entire object or parts thereof. Such algorithms, for example a so-called park detector, may be run directly on the initial model itself or may take into consideration information retrieved from databases in order to determine properties known for other objects when a similarity between the new object and an already annotated object can be identified. Such similarity may concern the entire object or parts thereof that have been identified as segments or parts of the entire object.

Alternatively, the prediction of properties of the object or parts thereof can be the result of morphing process. By morphing, a template object model which is already annotated is morphed onto the initial object model defining the geometry or shape of the new object. In the morphing process, the annotations that are associated to certain nodes or points of the model are maintained and thus transferred to the morphing result, which represents the new object. So the result of the morphing process is the initial object model, which is already annotated with the predicted properties which are transferred from the template object model by the morphing process. These annotations are then used as predicted properties that can be supplemented, deleted or adjusted by an operator as explained above.

FIG. 1 presents a system overview over the system 1 for creating an annotated new object model. The system 1 comprises a processor 2 that is connected to an output device, preferably an augmented reality or virtual reality display output device 3. Processor 2 generates the signals that are supplied to the output device 3 in order to visualize a representation of the object to be annotated as well as the predicted properties of the object. The representation is based on the initial object model, which might be retrieved from a database that is stored in a data storage 4, for example an internal or external memory. After the annotated new object model has been annotated, the processor 2 may also be configured to store the newly created annotated object model in the database in the data storage for. Thus, the new object model including the associated annotations will be available for a future annotation process and serve as an improved starting point, for example.

The software that is used in order to execute the method as explained might have a modular structure such that, for example, the parts detector, the manipulation, the morphing, and the like are realized in a plurality of different software modules, each of them being run on the processor 2. However, the processor 2 is only given as an example and the entire computation may be performed by a plurality of processors cooperatively performing the computation. This may even include cloud computation.

The processor 2 is further connected to a camera 5. The camera 5 is configured to capture images of objects or provide scans of the objects allowing to determine the three-dimensional shape of the object, for which an annotated object model shall be created. The image data of images captured by the camera 5 are supplied to the processor 2 so that analysis algorithms may be run on the image data and, for example automatically create the initial object model. Further, the image data may be processed in order to prepare the signal that can be supplied to the output device 3 in order to generate a representation of the object to be annotated.

Further, the processor 2 is connected to a perception device 6 allowing observation of an operator, particularly gestures the operator makes or a gaze of the operator. The perception device 6 may thus include a camera 6 for capturing images of the hands so that touching gestures, sliding movements and the like that are performed by an operator using his hands can be determined. The camera 7 captures images from the operator's hands and provides respective image data to the processor 2. The processor 2 is configured to analyze the data supplied and thus computes postures and movements of the hand of the operator. This allows the system to recognize whether the operator touches or manipulates the object, in case of a real world object is used by the operator to identify locations for which annotations shall be adapted, or to calculate corresponding locations in case that the virtual object presented by the virtual reality output device 3 shall be annotated. In such a case, collision between a point cloud or the mesh modelling the operator's hand, with the model representing the object to be annotated can be calculated. It is to be noted that the hand of the operator is only given as one intuitive example.

Additionally, the perception device may comprise an eye tracker 8. Perception of the eye movements of the operator allows to conclude at which location of the object to be annotated the operator looks. This information is determined by the processor 2 from the data, which is provided by the perception device 6 to the processor 2. Thus, based on the information acquired by the eye tracker 8, it is possible to identify in area, which is of interest to the operator. This information can then be used to supplement the location determined from the determination of gestures based on an input received from the camera 7. However, it is also possible to use information received from the eye tracker eight in order to determine which area of the objects shall be annotated by the operator. The information received from the eye tracker 8 and the information received from the camera 7 observing the gestures and movements of the hand of the operator are selection information, because they include the information which can be analyzed in order to determine a location of the object corresponding to a (virtual) touch by the operator, or the location at which the operator looks. Based on this selection information, the processor 2 identifies by calculating the location of the collision between the hand and the object or the location where the operator looked at, a portion of the object corresponding to the selection information. It is to be noted that the camera 5 and the camera 7 may be the same component and only for the sake of explanations of the invention, it is distinguished between camera 5 and camera 7.

The portion corresponding to the selection information is then visualized using the output device 3. This can be achieved for example by highlighting the collision location or the location where the operator looked at in the representation of the object to be annotated by the output device 3 as it is illustrated for example on the left part of FIG. 6.

The perception device 6 may additionally comprise a microphone 9. Using the microphone 9 the speech commands from the operator are acquired and respective signals are submitted to the processor 2. The speech commands can be used by the operator in order to instruct the system 1. These instructions may comprise the addition of annotations, the deletion of annotations or the adjustment of annotations, but also enhancement information used to improve the system's understanding regarding gestures used to define locations on the new object. One example might be that the portion of the object that shall correspond to a particular location that has been identified by the processor 2 from a perceived gesture of the operator can be adjusted regarding its dimensions. Starting from a default setting which identifies a portion around the calculated contact point between a finger of the operator and the object to be annotated, the operator may use the speech command in order to increase or decrease the size of the identified area surrounding the determined contact point.

Figure 2:
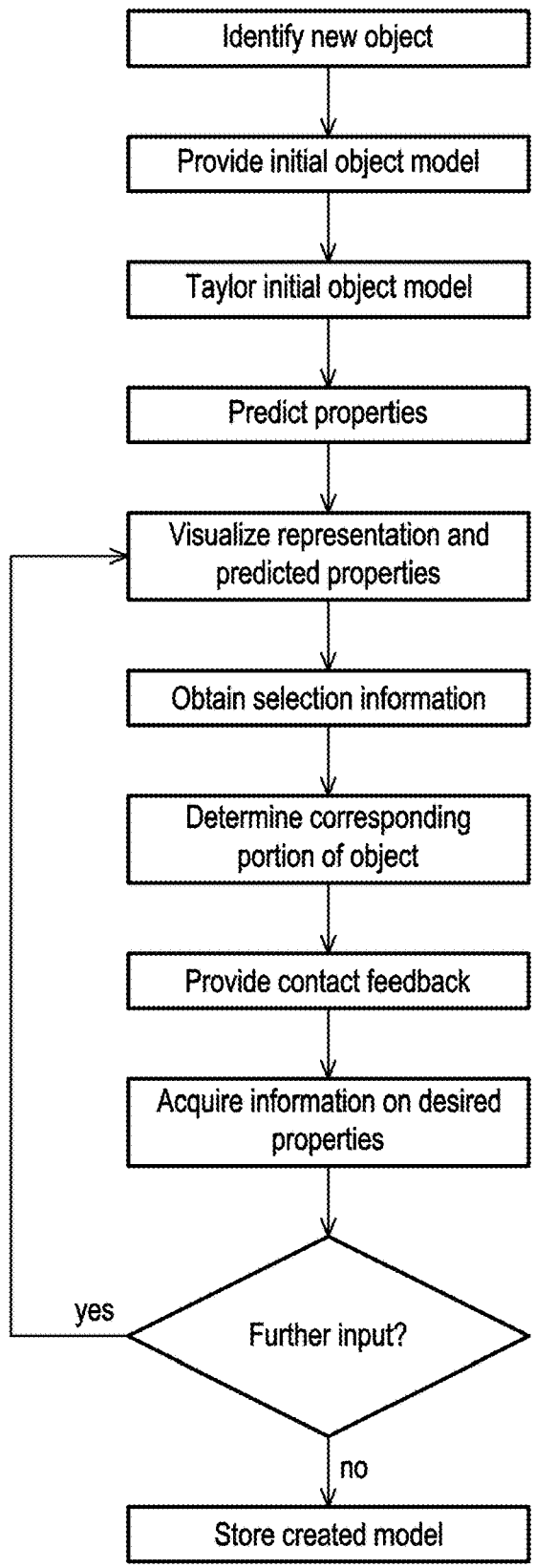
FIG. 2 illustrates a simplified flowchart describing assisted annotation to create a new annotated object model.

FIG. 2 shows a simplified flowchart illustrating the method steps for annotating an object model for a new, yet unknown object. In step S1 a new object is identified. The identification of a new object may be started from an image captured by the camera 5 based on which a suitable object model is selected, for example from a database, or generated using a 3D scan of the new object. The selection may be performed by the processor 2 by searching known object models in the database and comparing these object models with the shape and geometry of the new object. The model having the highest similarity with the new object may then be selected so that, in step S2, an initial object model can be provided. Alternatively, the identification of an object model can also be performed based on an input of the operator who uses his personal understanding and consideration to identify an object model having a high degree of similarity with the object to be annotated.

The term "object model" is to be understood as a data that can describe the shape of an object. The object model may be a point cloud, triangle mesh or polygonal mesh. Once the initial object model is provided, this initial object model can be adjusted and refined in step S3 in order to more closely correspond to the object for which an annotated object model shall be created. This adjustment of the initial object model can be performed using an operator input. For example, in the visualization of the representation based on the initial object model, the operator may select nodes or points of the object model and shift or delete them so that the resulting representation based on the adjusted initial object model better reflects the shape of the new object. In case that such an adjustment and refinement of the initial object model is performed, following explanations refer to the adjusted/refined initial object model.

After the initial object model has been satisfyingly adjusted to the new object, a prediction of object properties is performed in step S4. This prediction can either be performed directly based on the representation using algorithms that calculate from the object model certain properties, for example different segments using a part detector. Algorithms for performing such property prediction exist in the art and the skilled person will readily select reasonable algorithms for the prediction of certain object properties. The parts detector can be trained on annotated object models from existing databases or it can be a result of interactive object annotations in the past. In order to learn from the operator's reaction (acceptance of the suggested segmentation or decline of the suggestion), the parts detector can be adapted to the operator's input. Alternatively, another object model similar to the initial object model and for which annotations are already available may be selected from a database and used as a template object model. This template object model is then morphed to transform the template model onto the initial object model. This transformation is used in order to transfer the annotation information from the template object model to the initial object model thereby predicting properties for the initial object model. This can be achieved by transferring the segmentation or other annotations for example to the nearest model vertex or face. The resulting annotation of the initial object model is then used as a starting point for adapting the annotation based on an operator's input.

Examples for object properties include: designation of parts, segmentation of the entire object thereby defining different parts of the object, affordances like graspable, placeable, removable and the like, relations between object parts, appearance properties like for example colors, and material properties like for example wood, steel, glass or the like. It is to be noted that the relations between object parts may not be limited to the same object but also include relations to multiple objects. Examples for such relations are "can be placed into", "can be put onto", "fits into", . . . .

Thereafter, in step S5 the predicted properties (annotations) are visualized together with the representation of the object itself. The visualization is performed such that the location of the object where a certain property is displayed corresponds to a part or an area of the part or the entire object for which the respective property is valid. For example, in case the object is a certain type of the bottle including a cap, properties related to the cap are displayed in close spatial relationship such that the operator may directly recognize this association. In case that there are so many properties that shall be provided by the visualization to the operator that the spatial relation might be ambiguous, connecting lines or other auxiliary measures, for example use of color codes can be added. The color code may for example use the same color for identifying a certain part (the cap of the bottle for example) and the properties that are listed besides the cap of the bottle. Another color can then be used for the body of the bottle and the properties that are listed besides the body of the bottle.

Based on the visualization of the representation of the initial object model and the predicted properties, the operator then starts selecting a certain part or location of the representation and, thus, of the represented object. Based on such an input of selection information with which the operator performs the selection of a portion of the objet, the portion corresponding to the selection information is determined by the processor 2. Once the portion that corresponds to the selection information input by the operator has been determined, the operator can start to add, delete, or adjust the properties concerning this determine portion of the object. It is to be noted, that the portion may be an entire part of the object to be annotated. Referring to the example using the cap and a body that commonly form the bottle, the location that is touched by the operator may correspond to a displayed frame that is used to indicate a certain part of the object. The segment could for example be the cap, and when the location that is touched by the operator is determined to be a point of the frame indicating the segment corresponding to the cap, the system understands that properties referring to the entire part shall be adapted. The identification of a portion corresponding to the selection information input by the user is performed in step S7.

In case that a virtual reality output device 3 is used, the feedback informing the operator about an identified contact with the virtual object is provided in step S8, using for example a glove provided with a plurality of actuators or a wristband. Both, the glove provided with a plurality of actuators and the wristband allow to stimulate the hand or wrist of the operator so that it is intuitively recognizable that at that point in time he collided with the object to be annotated and submitted a selection information to the processor 2.

Once the area of the object, or the object model representing the object, which is selected by the operator by inputting selection information has been identified, the operator adapts the annotations (object properties) as desired. The system 1 therefore acquires information on the desired adaptation in step S9. Preferably, the microphone 9 is used in order to receive spoken information from the operator and, based on such speech input, the processor 2 determines the adaptation intended to be performed by the operator. Such adaptation may include addition of an annotation/property, deletion of the predicted annotation/property, but also an adjustment. It is considered that any speech input which allows an identification of a portion of the object refers to an adaptation of the properties associated with this specific portion or part of the object. Only in case that a keyword is used to trigger a different function, the process of adapting the annotations/properties of the identified area of the object is ended. Such a keyword could for example be "end annotation". After an adaptation of the annotation was ended by the operator using such a keyword it could for example be concluded that no additional adaptation of annotations/properties is intended, and the created annotated object model is then stored in the database as mentioned above in step S12. In step S10 it is thus decided whether an additional input is expected from the operator or not. The decision can also be based on a time out, when for example for a certain period of time no additional speech input can be recognized.

In case that the further input is made by the operator, the procedure proceeds with step S5 again based on an updated visualization using the already adapted properties. Thus, at any point in time, the operator is provided with all information that is available for the current object model.

Figure 3:
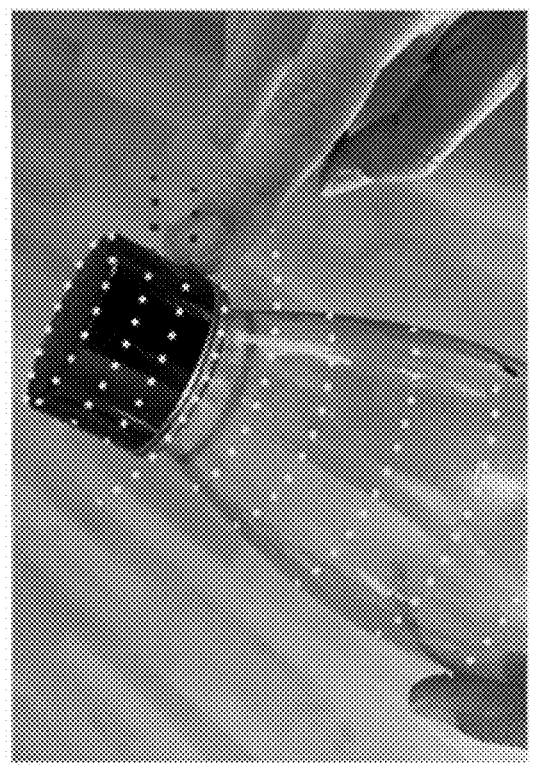
FIG. 3 shows an example of a visualization of a representation of an object to be annotated and the process for improving the initial object model.
Figure 3:
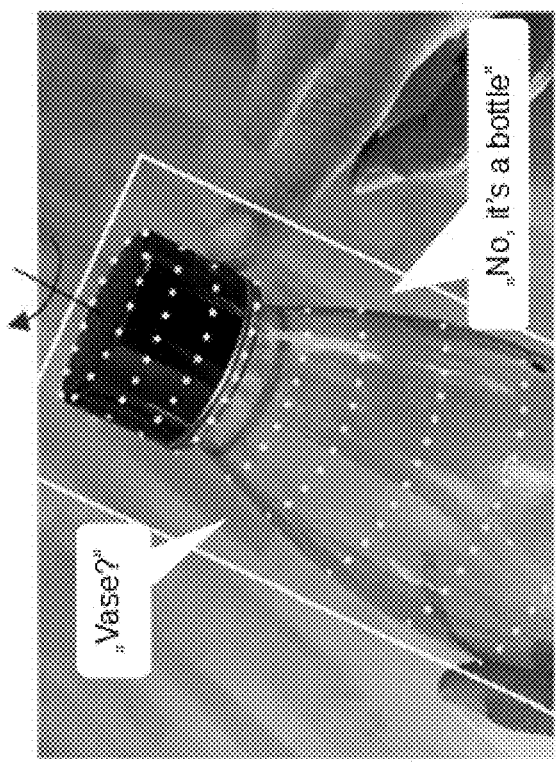

FIG. 3 illustrates the process of interactively identifying an object model that may be used as a starting point for the prediction of properties for the model to be annotated. An image of the new object is captured by the camera and an object model that might be a suitable starting point is searched, for example, based on similarity in a database. The system tries to identify an object type and makes a respective suggestion. In the illustrated example, the system proposes that the new object is a vase. Using speech input, the operator corrects the proposal by informing the system that the object is a bottle. In the illustrated example, the system proposes a point cloud, the can be corrected by the user as it is shown in FIG. 3a. The correction may include removal of outliers of the point cloud on the edge surface. This correction is preferably performed during the scanning phase in which the camera 5 takes images of the object in order to identify a suitable category to suggest it to the operator.

The frame surrounding the object as shown in FIG. 3b indicates that the single segment is identified by the system 1 and presented as an overlay of the representation of the bottle.

Figure 4:
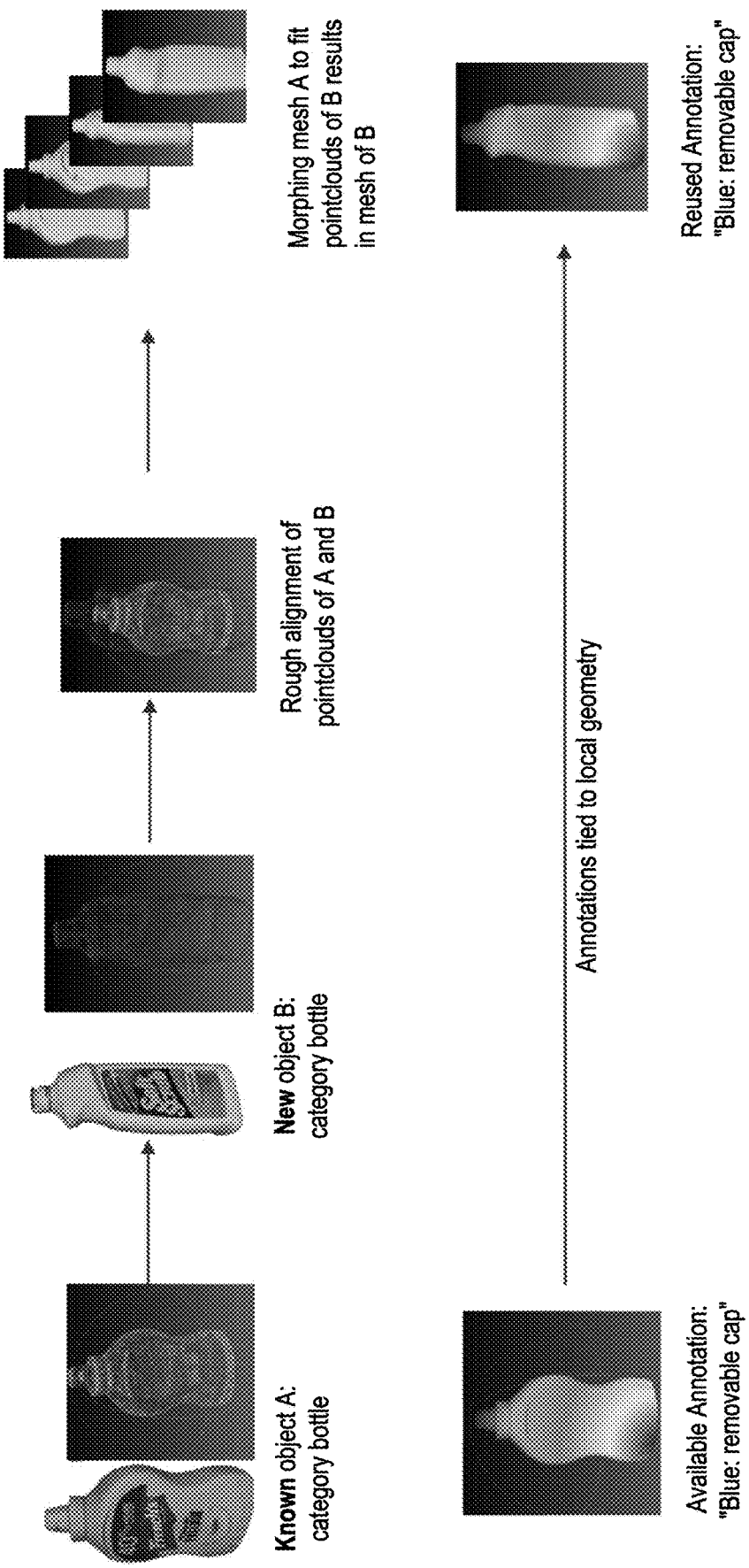
FIG. 4 shows an exemplary way of predicting annotations for an object for which an annotated object model shall be created.

FIG. 4 shows the process of property prediction using morphing a known object which is in the category either proposed by the system and confirmed by the operator, or from the category that was identified directly by the operator, as mentioned above. Starting from a known object model (template object model), which is already annotated, the point cloud of the template object model is morphed onto the point cloud of the not yet annotated initial object model. The morphing starts with the rough alignment of the two point clouds. In case that the alignment make significant errors, for example the lining the template object model to the initial object model upside down, it is possible that the operator interacts in turns the template object model for a better coincidence with the initial object model.

The annotations that were made for the known object and thus included in the template object model are maintained during the morphing process so that these annotations are tied to the local geometry. Thus, at the end of the morphing process, the initial object model of the new object takes over the corresponding annotations/properties to the corresponding local geometry. These taken over properties are then considered presented as the predicted properties for the new object. As it was explained above, additions, deletions or adjustments can then be performed on these predicted properties in order to finally create an annotated object model for the new object. The principle of starting from a known object and its annotated object model and morphing the template model onto the initial object model of the new, unknown object thereby taking over the annotations, because they are tied to the local geometry, is illustrated in FIG. 4.

Figure 5:
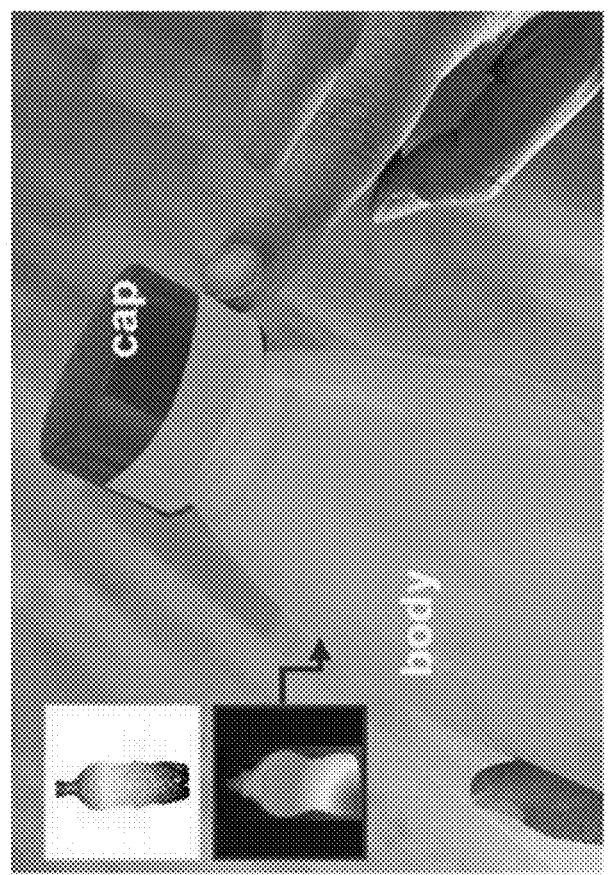
FIG. 5 shows an example for predicting properties for the initial object model.
Figure 5:
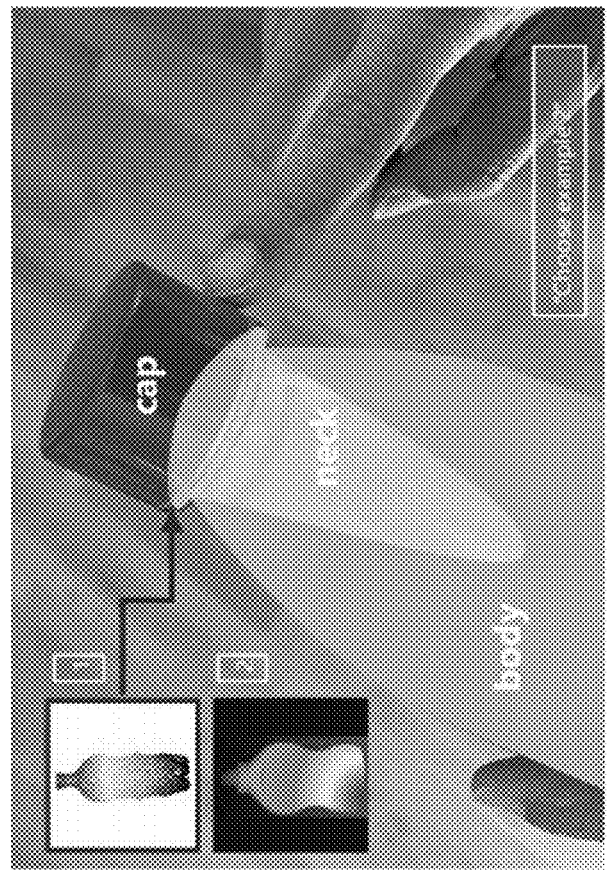

FIG. 5 shows another detail of the interactive annotation process. As explained with respect to FIG. 3, the operator either confirms or corrects the category of the new object, and the system may then make a proposal of a plurality of different objects belonging to this category, if available. In the illustrated embodiment, two different object models for bottles, which could serve as starting points for predicting annotations are presented.

The system, at first proposes example 1. This proposal is directly visualized using the augmented reality output device 3. In case that the operator would rather prefer the second object model of the same category, he uses a speech command to force the system to switch to example 2 as a starting point for further annotation. So in the present case, the operator inputs "choose example 2". As can be seen on the right side of FIG. 5, the system immediately switches to the second example for a known object model and displays a representation based on this second object model being morphed onto the initial object model as explained above thereby transferring the annotations to the initial object model as predicted properties.

Figure 6:
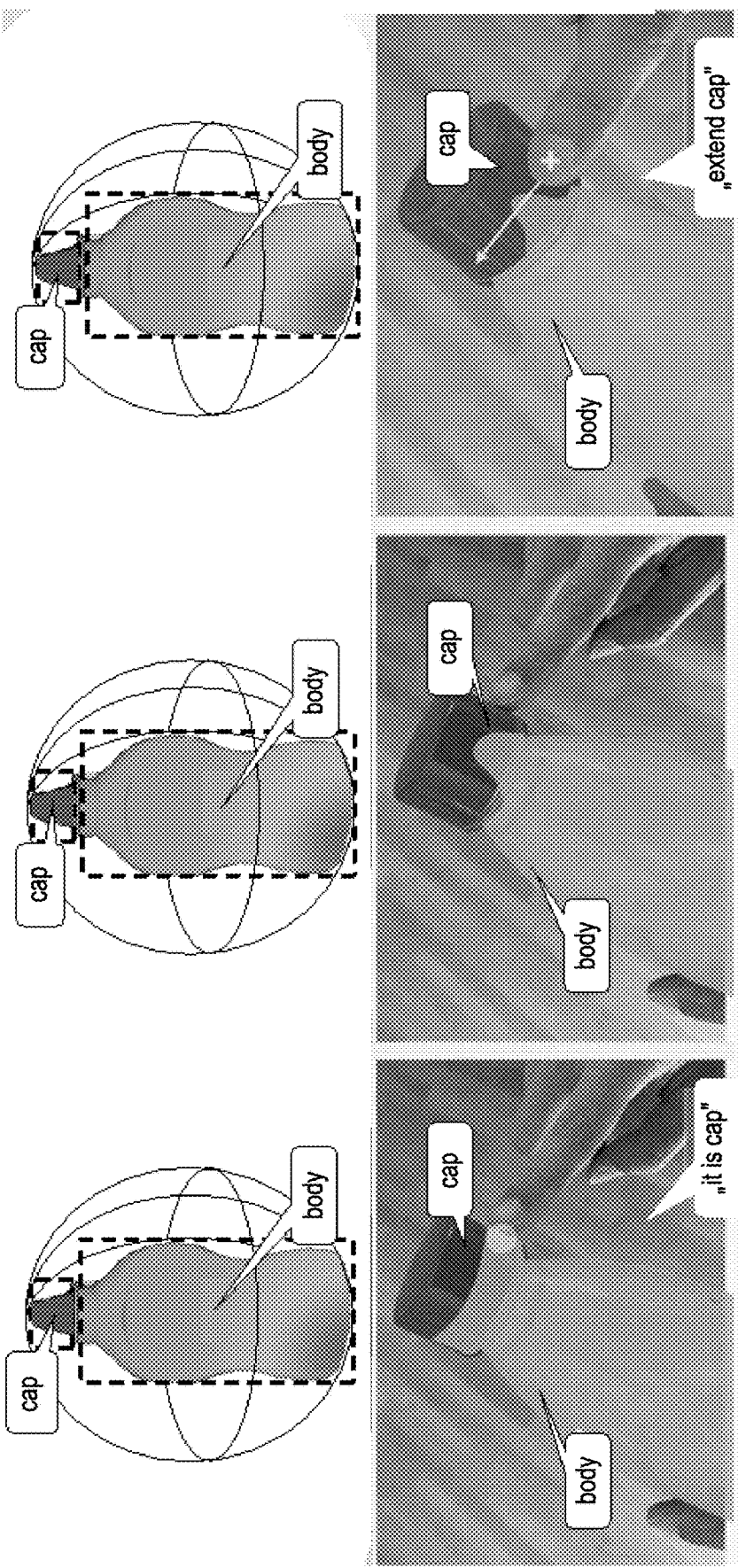
FIG. 6 shows an example detail of the process of adapting predicted object properties.

FIG. 6 shows how gestures of the user that are perceived by the camera 7 and analyzed by the processor 2 are used in combination with speech input in order to amend the predicted properties of the new object. On the lower left side of FIG. 6, it can be seen that the operator touches an area of the object which was, based on the predicted properties of the chosen model identified to belong to the body of the bottle. The predicted parts "body" and "cap" are displayed in close spatial relation with the corresponding portion of the representation of the bottle. However, the operator would like to change this area to belong to the part "cap". Thus, for inputting selection information, he touches allocation of the area that was identified as body in error and corrects this using the speech command ("It's a cap"). The system then automatically adapts the segmentation, identifying the two parts of the bottle, namely "body" and "cap" according to the identified area determined from the selection information input by the operator. The segment is identified by the system as shown in the upper part of FIG. 6. The location determined from the input selection information is indicated by the white circle. As it can be seen in the middle of FIG. 6, this might still result in an erroneous segmentation. The additional input shown in the lower right part of FIG. 6 allows correction of the erroneous interpretation of the system. The sliding gesture made by the operator is used to indicate that the entire region where the sliding gesture comes across shall be considered for the input annotation. This gesture can even be enhanced by using a speech input. In the present case, the spoken command "extend cap" clarifies that the area defined by the sliding movements shall now all be part of the cap.

Alternatively, the frames indicating the segments that are illustrated in the upper part of FIG. 6 could also be shifted directly by the operator in order to adjust the proposed segmentation.

In the illustrated embodiment only o single perspective is shown. However, some portions of the object which are important and require annotations may be occluded in that perspective. The operator therefor can manipulate the representation of the object in order to make other portions visible. The manipulation may comprise not only changing the viewpoint but also zooming the representation.

The above described method for creating an annotated object model for a new real world object does not need to be executed prior to operating a robot system. The method is also specifically advantageous for application in a telerobot system. This enables the operator of the telerobot system to let the system learn new object including their properties while the system is in use. In order to ensure proper selection information in such a situation, the robot may use a laser pointer to allow control of a location of the new object at which the teleoperator wants to point for providing a desired annotation (including deletion of an annotation). Further, the robot's arms can be used instead of the operator's hand, for which the selection information input was explained above.

What is claimed is:

1. A method for creating an annotated object model of a real world object, the method comprising the following method steps:
    providing an initial object model for an object for which an annotated object model is to be created,
    predicting properties of the object by generating object properties for the initial object model by morphing a template model onto the initial object model and transferring properties known for the template model as predicted properties for the initial object model,
    wherein the properties and the predicted properties include at least one of a designation of parts of the object, a segmentation of the object defining different parts of the object, affordances of the object that comprise at least one of graspable, place-able, and removable, relations between object parts of the object, appearance properties of the object including at least one of a color, material properties of the object comprising at least one of wood, steel, and glass, and relations between multiple objects,
    visualizing a representation of the object based on the initial object model wherein the predicted properties of the object are displayed associated with the representation,
    obtaining selection information based on at least one of a user gesture, user pointing operation, user speech input, and user gaze perceived by a user perception device,
    determining a portion of the object corresponding to the selection information,
    receiving property information from a user input,
    associating the input property information with the corresponding portion of the object.

2. The method according to claim 1, wherein the representation is visualized using an augmented reality (AR) display or a virtual reality (VR) display.

3. The method according to claim 1, wherein the selection information is enhanced by a command input by an operator.

4. The method according to claim 1, wherein
the selection information comprises at least first selection information and second selection information, and the property information defines a relation between portions of the object corresponding to the at least first and second selection information or a property common to the portions.

5. The method according to claim 1, wherein
the determination of the portion of the object depends on at least one of a type of a gesture, a position of collision between the representation of the object and a perceived operator hand, and a position on the displayed representation pointed at.

6. The method according to claim 5, wherein
in case of a collision between the representation of the object and the perceived operator hand is determined, a feedback is provided to an operator.

7. The method according to claim 1, wherein
the predicted properties include at least a definition of segments defining parts of the object.

8. The method according to claim 1, wherein
the predicted properties include at least a definition of segments and the segments of the object are visualized as an overlay over the representation of the object.

9. The method according to claim 1, wherein
the associated display of the predicted object properties displays each predicted property in spatial relation to a respective portion of the object for which the property of the object is predicted, and the representation of the object together with the associated predicted properties of the object is manipulated according to a manipulation input received from an operator.

10. The method according to claim 1, wherein
based on a perceived operator input, the initial object model is adapted and the displayed representation is updated accordingly.

11. The method according to claim 1, wherein
the initial object model is analyzed by an object part detector for automated segmentation of the object based at least on one of database information and previously received information from an operator during creation of an annotated object model process.

12. A system for creating an annotated object model of a real world object, the system includes
a processor,
an output device, and
an operator perception device,
the processor being configured to be provided with an initial object model for an object for which an annotated object model is to be created,
to predict properties of the object by generating object properties for the initial object model by morphing a template model onto the initial object model and transferring properties known for the template model as predicted properties for the initial object model,
wherein the properties and the predicted properties include at least one of a designation of parts of the object, a segmentation of the object defining different parts of the object, affordances of the object that comprise at least one of graspable, placeable, and removable, relations between object parts of the object, appearance properties of the object including at least one of a color, material properties of the object comprising at least one of wood, steel, and glass, and relations between multiple objects,
to control the output device to visualize a representation of the object based on the initial object model, wherein the predicted properties of the object are displayed associated with the representation,
to determine a portion of the object corresponding to selection information obtained by the operator perception device based on at least one of a user gesture, user pointing operation, user speech input, and user gaze perceived by the operator perception device, and
to associate property information input by an operator with the corresponding portion of the object.

13. A system according to claim 12, wherein the output device comprises an augmented reality (AR) display or a virtual reality (VR) display.

14. A system according to claim 12, wherein the operator perception device comprises at least a camera for perceiving operator movements.

15. A system according to claim 12, wherein the operator perception device comprises at least a microphone.

16. A system according to claim 12, wherein the system comprises a feedback device for informing the operator of a determined contact with the visualized presentation of the object.

17. A system according to claim 12, wherein the processor is connected to a database and the processor is configured to store the annotated object model in the database.

* * * * *